US012013676B2

(12) United States Patent
Claussen (10) Patent No.: US 12,013,676 B2
(45) Date of Patent: Jun. 18, 2024

(54) PROGRAMMABLE LOGIC CONTROLLER-BASED MODULAR ACCELERATION MODULE FOR ARTIFICIAL INTELLIGENCE (71) Applicant: Siemens Aktiengesellschaft, Munich (DE)

(72) Inventor: Heiko Claussen, North Brunswick, NJ (US)

(73) Assignee: Siemens Aktiengesellschaft, Munich (DE)

( * ) Notice: Subject to any disclaimer, the term of this patent is extended or adjusted under 35 U.S.C. 154(b) by 613 days.

(21) Appl. No.: 17/261,241

(22) PCT Filed: Aug. 20, 2018

(86) PCT No.: PCT/US2018/047030
§ 371 (c)(1),
(2) Date: Jan. 19, 2021

(87) PCT Pub. No.: WO2020/040721
PCT Pub. Date: Feb. 27, 2020

(65) Prior Publication Data
US 2021/0263493 A1 Aug. 26, 2021

(51) Int. Cl.
G05B 19/05 (2006.01)
G05B 19/418 (2006.01)
(Continued)

(52) U.S. Cl.
CPC ..... *G05B 19/054* (2013.01); *G05B 19/41835* (2013.01); *G06N 20/00* (2019.01);
(Continued)

(58) Field of Classification Search
CPC ............ G05B 19/054; G05B 19/41835; G05B 2219/13166; G05B 2219/15109; G05B 2219/1103; G06N 20/00
(Continued)

(56) References Cited

U.S. PATENT DOCUMENTS 7,668,613 B2    2/2010 Baier et al.
11,063,916 B1 *  7/2021 Ferreira ............... G05B 19/054
(Continued)

FOREIGN PATENT DOCUMENTS

CN    204881835 U    12/2015
CN    106354082 A    1/2017
(Continued)

OTHER PUBLICATIONS

PCT International Search Report and Written Opinion of International Searching Authority dated May 24, 2019 corresponding to PCT International Application No. PCT/US2018/047030 filed Aug. 20, 2018.
(Continued)

*Primary Examiner* — Michael J Brown (57) ABSTRACT

A controller system includes a CPU module, one or more technology modules, and a backplane bus. The CPU module comprises a processor executing a control program. The technology modules include an artificial intelligence (AI) accelerator processor configured to (a) receive input data values related to one or more machine learning models, and (b) apply the machine learning models to the input data values to generate one or more output data values. The backplane bus connects the CPU module and the technology modules. The technology modules transfer the output data values to the processor over the backplane bus and the processor uses output data values during execution of the control program.

20 Claims, 3 Drawing Sheets (51) Int. Cl.
*G06N 20/00* (2019.01)
*G05B 19/41* (2006.01)

(52) U.S. Cl.
CPC ........... *G05B 2219/13166* (2013.01); *G05B 2219/15109* (2013.01)

(58) Field of Classification Search
USPC .............................................................. 700/9
See application file for complete search history.

(56) References Cited

U.S. PATENT DOCUMENTS

| | | | |
|---|---|---|---|
| 2008/0313228 | A1 | 12/2008 | Clark et al. |
| 2009/0088870 | A1 | 4/2009 | Baier et al. |
| 2016/0054720 | A1* | 2/2016 | Lo .................. G05B 19/056 700/87 |

FOREIGN PATENT DOCUMENTS

| | | | |
|---|---|---|---|
| CN | 106796423 | A | 5/2017 |
| CN | 107615310 | A | 1/2018 |
| CN | 108292816 | A | 7/2018 |
| DE | 9218421 | U1 | 2/1994 |
| EP | 0603560 | A1 | 6/1994 |
| JP | S60166006 | U | 11/1985 |
| JP | 2005182785 | A | 7/2005 |
| JP | 2006065850 | A | 3/2006 |
| JP | 2017033040 | A | 2/2017 |
| JP | 2017097718 | A | 6/2017 |
| JP | 2018041300 | A | 3/2018 |
| JP | 2018097663 | A | 6/2018 |
| WO | 2017200622 | A2 | 11/2017 |

OTHER PUBLICATIONS

Wang, Wen et al.; Information & Communications, "Research on Elechtromechanical System Reconfiguration Technology Based on Backplane Bus"; published Nov. 15, 2017; pp. 1-20.

Wang, Zaoyi et al; "PAC-Advanced Programmable Automatic Controller"; Electrical World; published Feb. 5, 2010; pp. 1-20.

* cited by examiner

PROGRAMMABLE LOGIC
CONTROLLER-BASED MODULAR
ACCELERATION MODULE FOR
ARTIFICIAL INTELLIGENCE

TECHNICAL FIELD

The present invention relates generally to an AI acceleration module that may be employed in programmable logic controllers (PLC) and other control systems, along with methods, systems, and apparatuses related thereto. The disclosed technology may be applied to, for example, various complex factory environments where programmable controllers and multiple devices generating high-speed inputs are used.

BACKGROUND

The $4^{th}$ industrial revolution builds on the digital revolution and is defined by many emerging technologies including artificial intelligence (AI), robotics, the internet of things (IoT), etc. The goal is to enable a new level of applications, the systems become flexible to changes in its environment, require less manpower for setup or operation and thus save costs. For example, in one application mobile robots can transport work pieces from one machine to another as needed. If a machine fails, the systems are automatically transporting the work pieces to another system that can fulfill the next necessary task. The overall workflow is optimized to enable just in time delivery. In another application, cameras can monitor a process e.g., a paste being attached to a conductor. If abnormal particles, gaps or other issues are detected, this information is feed back into the process control for continuous optimization. In yet another application, a robot needs to pick unknown, adversarial objects from a bin. This should be accomplished reliably, without 3D computer-aided design (CAD) drawings of the objects and without reprogramming. Such applications are, for example, required in warehouses to box and deliver a set of products to a customer.

All these applications have a commonality in that they require modern technology for high speed data analytics. For example, the bin picking application can be accomplished using a neural network called DexNet based on 3D cloud point camera input. The monitoring of the paste deposition can be accomplished by novel algorithms based on infrared camera input. The mobile robot application requires multiple sensor inputs like LIDARs and cameras to navigate its environment. Other applications like condition monitoring or predictive maintenance will require audio, vibration, or other high speed inputs.

In addition to the high bandwidth input data and the use of advanced algorithms, all these applications have in common that they require to react in real time to changes in their environment. Therefore the computation has to be performed at the device rather than within, for example, a cloud infrastructure. Also, most discrete and process control in industry requires Programmable Logic Controllers (PLCs) for control. A PLC is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system. PLCs enable reliable operation in harsh or dangerous environments, provide real-time guarantees and enable redundancy and failsafe concepts. Given the broad use and optimization of PLCs for the manufacturing environment it is important that a solution is well integrated with them.

Conventional PLCs are not designed to perform the advanced algorithms or provide sufficient computing resources to address these problems. Also, AI-based applications are often very uniquely fitting to one application. That is, a very flexible solution is required that can scale with performance requirements and enable algorithms specific for different domains (e.g., video, audio, vibration, spectral images, etc.). Moreover, the acceleration of AI algorithms needs to be synchronous with the PLC program to enable reliable integration with available control strategies. Given the large market of PLCs in the field it is also critical that devices are retro-fit able and that well established tools such as Siemens Total Integrated Automation (TIA) Portal can be used for programming. Otherwise, most current customers will have difficulties to integrate these novel technologies into their production.

SUMMARY

Embodiments of the present invention address and overcome one or more of the above shortcomings and drawbacks, by providing methods, systems, and apparatuses related to an AI acceleration module that may be employed in programmable logic controllers (PLC) and other control systems.

According to some embodiments of the present invention, a controller system includes a CPU module, one or more technology modules, and a backplane bus. The CPU module comprises a processor executing a control program. The technology modules include an AI accelerator processor configured to (a) receive input data values related to one or more machine learning models, and (b) apply the machine learning models to the input data values to generate one or more output data values. The backplane bus connects the CPU module and the technology modules. The technology modules transfer the output data values to the processor over the backplane bus and the processor uses output data values during execution of the control program.

According to other embodiments, a method for executing a machine learning model within a controller system comprising a CPU module and a technology module includes generating, by the technology module, one or more input data values based on data produced by devices external to the controller system. An AI accelerator within the technology module applies one or more machine learning models to the input data values to generate one or more output data values. The technology module writes the output data values to a backplane connecting the CPU module and the technology module, and the CPU module reads output data values from the backplane. Once the output data values are received, the CPU module executes an application program that utilizes the output data values.

According to another embodiment of the present invention, a method for programming a control system includes displaying a graphical user interface (GUI) that includes a block-based editor for programming an automation program. A visual representation of a machine learning model is inserted into a function block displayed in the GUI based on one or more user commands. A type signature of the machine learning model is identified that defines inputs and outputs of the machine learning model. The inputs and outputs of the function block are automatically defined based on the inputs and outputs of the machine learning model. An input source is connected to at least one of the inputs of the function block, and outputs of the function block are connected to an additional function block. The function block is compiled to generate code executable by the control system.

According to other embodiments of the present invention, a controller system comprises a CPU module, one or more technology modules, and an interface module that exchanges data between the CPU module and the technology modules. The CPU module comprises a processor executing a control program. The technology modules comprise an AI accelerator processor configured to (a) receive input data values related to one or more devices, and (b) apply one or more machine learning models to the input data values to generate one or more output data values. The technology modules transfer the output data values to the processor via the interface modules and the processor uses output data values during execution of the control program.

According to another embodiment of the present invention, a controller system includes a CPU module comprising a processor executing a first control program and one or more technology modules. Each technology module comprises an artificial intelligence (AI) accelerator processor configured to receive input data values related to one or more devices, and apply one or more machine learning models to the input data values to generate one or more output data values. The AI accelerator processor executes a second control program to generate control instructions for the devices based on the output data values. The control instructions are transmitted to the devices via one or more input/output ports of the technology module at a first data rate. Status messages are transmitted to the CPU module via a backplane bus or an interface module at a second data rate that is slower than the first data rate.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate to a PLC-based acceleration module for AI applications. More generally, the techniques described herein enable a hardware platform for AI acceleration at the device level using a computing module (referred to herein as a "technology module") that can be directly integrated into the chassis of the controller system. This technology module includes an AI accelerator processor that facilitates the execution of machine learning directly within the PLC; allowing high speed inputs to be processed directly and with minimal overhead jointly with data from other input modules or PLC variables to make AI-based decisions for modifying the control environment.

Figure 1:
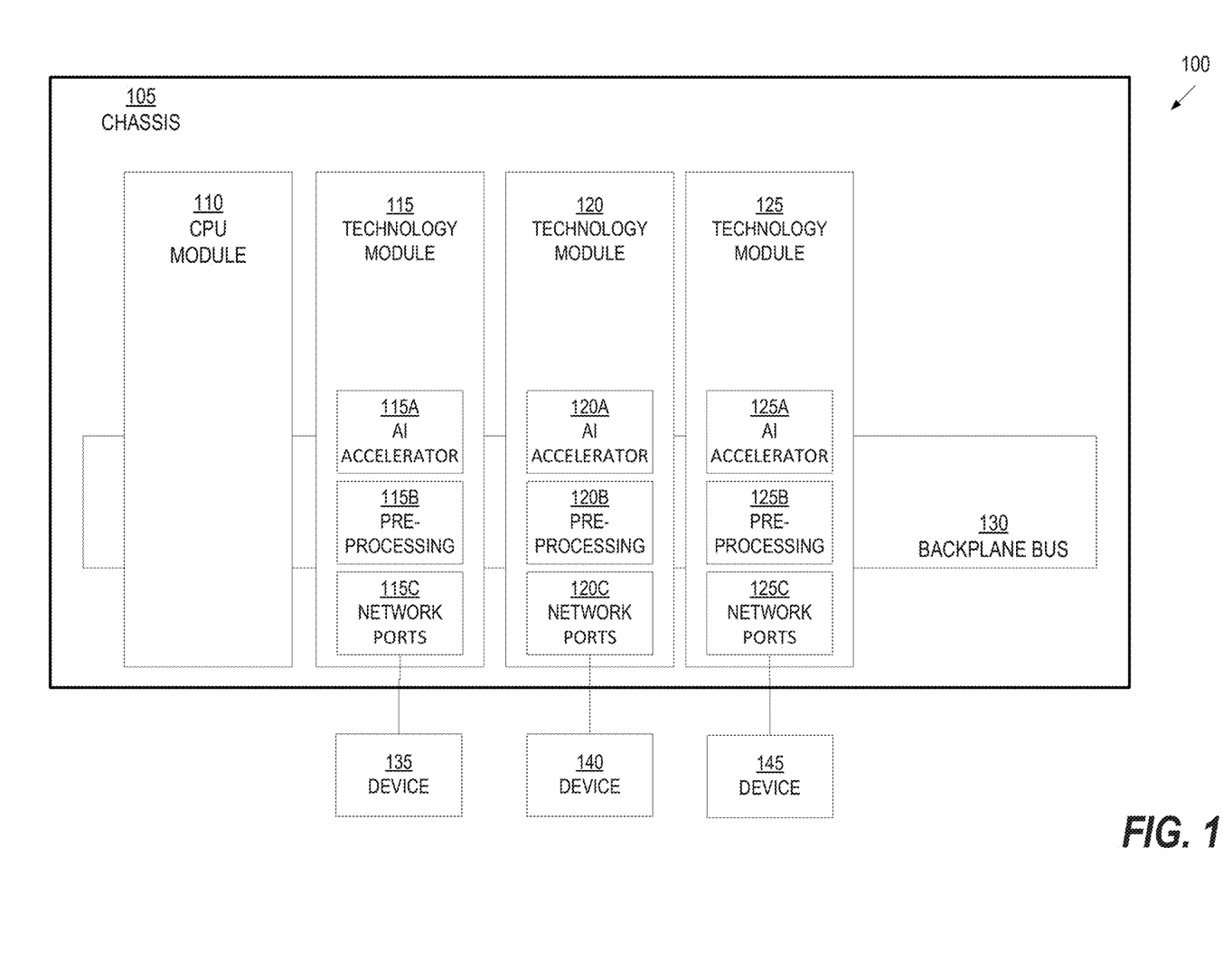
FIG. 1 illustrates an example controller system, according to some embodiments.

FIG. 1 illustrates an example controller system 100, according to some embodiments. The term "controller system" is intended to encompass both PLCs, as well as other digital control computers that have functionality similar to PLCs. Briefly, the control system 100 includes a CPU module 110 and three technology modules 115, 120, and 125. Each of the modules 110, 115, 120, 125 is connected via a backplane bus 130. The entire controller system 100 is housed in a chassis 105. In general, the techniques described herein may be implemented using any modular controller system known in the art. For example, in one embodiment, the controller system is a SIMATIC ET 200SP.

As is generally understood in the art, the backplane bus 130 is an internal data bus for transferring data between the modules 110, 115, 120, 125. Various techniques may be used for creating the backplane bus 130. For example, in one embodiment, the backplane bus 130 is part of the chassis 105 and the chassis comprises a plurality of plugs (not shown in FIG. 1) that allow the modules 110, 115, 120, 125 to connect to the backplane bus 130. In other embodiments, the modules 110, 115, 120, 125 each include interconnecting plugs (not shown in FIG. 1) that form the backplane bus 130.

The CPU module 110 comprises a processor that performs a series of operations referred to as a "scan cycle." First, inputs are read from, for example, the backplane bus 130 or an area of memory within the CPU module 110 referred to as the "process image." Next, an executable application, referred to herein as the "control program," is executed to apply logic to the inputs and generate one or more control instructions for the devices 135, 140, 145. The control instructions and any other outputs are then written to the devices 135, 140, 145 and/or the backplane bus 130, as appropriate.

Each technology module 115, 120, and 125 comprises an artificial intelligence (AI) accelerator processor 115A, 120A, and 125A, and a set input/output ports 115C, 120C, 125C (e.g., network ports, USB, CAN, analog inputs, charge inputs, etc.) that facilitate a direct connection to devices 135, 140, 145. The devices 135, 140, 145 provide high-speed inputs to the technology modules 115, 120, and 125 such as, for example, images, videos, audio signals, vibration sensor values, etc. It should be noted that the inputs may not always be high speed. For example, video has only few frames per second but the data rate is still very high. This is just one example for a measurement that comprise many relatively slowly (e.g., 30 Hz) changing sensor signals (e.g., each pixel). Also, in some instances, the technology module(s) may combine high throughput information with slow data such as a video stream and the status of the machine. The status of the machine (e.g., an RPM) can be read through the backplane bus 130 from the CPU module 110 or another input module.

Each AI accelerator processor 115A, 120A, 125A configured to receive input data values related to one or more devices 135, 140, 145 (e.g., via the backplane bus 130 or the input/output ports 115C, 120C, 125C). Once these input data values are received, each AI accelerator processor 115A, 120A, 125A executes a machine learning model. The machine learning model may be uploaded on to the technology modules 115, 120, and 125 using the input/output ports 115C, 120C, 125C, the backplane bus 130, or other techniques known in the art (e.g., an SD card).

In some embodiments, each technology module further includes a pre-processing component 115B, 120B, and 125B configured to generate the input data values for the machine learning models based on data received from the devices 135, 140, 145. In some instances, the raw input from the device may be directly used as the input data values for the machine learning models. However, in other instances, each pre-processing component 115B, 120B, and 125B may use a set of rules or functions for transforming the data. For example, a raw analog signal can be sampled to provide time series data that can be used as input. A raw analog time series signal can be transformed into a spectrogram from a defined time period. The spectrogram representation can be generated for every 0.5 seconds with half overlapping windows from raw signals of length 1 second. These spectrograms can be the input for a machine learning model.

The rules or functions for transforming data from a particular device may be pre-loaded on each device prior to installation. Alternatively, the rules or functions may be dynamically loaded as needed. For example, in one embodiment, in response to connecting a particular device via the networking ports of a technology module, the technology module may retrieve the rules or function for transforming data from that particular device from data source local or external from the controller system 100.

Each AI accelerator processor 115A, 120A, and 125A applies one or more machine learning models to the input data values to generate one or more output data values. Once generated, the technology modules 115, 120, and 125 transfer the output data values to the CPU module 110 over the backplane bus 130 and the processor in the CPU module 110 uses output data values during execution of the control program.

In general, any AI accelerator processor known in the art may be used in the controller system. For example, in one embodiment, each AI accelerator processor 115A, 120A, 125A is the Intel Myriad X. The AI accelerator processor 115A, 120A, and 125A uses an architecture that is optimized for high bandwidth but low power operation. For example, in some embodiments, an architecture is employed that accelerates by minimizing data transfer within the chip memory or by accelerating matrix multiplication which is heavily used in neural network computations. In other embodiments, neural network primitives and common data preprocessing functions are implemented in hardware. This allows high performance of operations at a lower power profile in comparison to common alternative implementation such as GPU-based acceleration. For example, in comparison, NVIDIAs Tegra X2 performs at about 1 TOPS but uses up to 15 W which is not practical in a passively cooled controller system. In some embodiments, each AI accelerator processor 115A, 120A, and 125A also contains two LEON CPUs and 16 SHAVE vector processors for added application flexibility. That is, each AI accelerator processor 115A, 120A, and 125A has everything needed to flexibly implement a processing pipeline from the data acquisition (e.g., from USB or Ethernet), preprocessing, machine learning and output to the backplane bus 130 of the controller system. It should be noted that the example described above is relevant to the Myriad X processor; however, the techniques described herein are not limited to any particular type of AI accelerator. This flexibility also enables the deployment of machine learning models other than neural networks such as support vector machines, random forest, hidden markov models, principal component analysis, and others generally known in the art.

The fact that each AI accelerator processor 115A, 120A, 125A is directly connected through the backplane bus 130 has the advantage that the output of the machine learning models is synchronously usable in the controller system 100. That is, at every cycle of the backplane bus 130, the current output values can be shared and used for process control. Also, given this format, the technology module 115, 120, 125 can be attached to most, if not all, other control systems by the use of an interface module that translates the backplane information to another interface such as Process Field Net (PROFINET). That is, any controller that can communicate through this interface and has the interface description to communicate with the technology module can utilize the module.

Although the example of FIG. 1 shows 3 technology modules 115, 120, 125 being used, in general, the number of technology modules can be increased or decreased as required based on, for example, the number of high speed inputs or processing power required for an application. Additionally, where multiple technology modules are employed, each technology module maybe dedicated to a different task. For example, technology module 115 could process a Light Detection and Ranging (LIDAR) input, technology module 120 may process a vibration signal, and technology module 125 may process data from a point cloud 3D camera. The results of the first two inputs from technology modules 115, 120 can be shared with technology module 125 and included in the processing to recognize a particular scenario. Thus, it is possible to create complex and demanding applications without the performance limits of the hosting controller system. It is even possible to add such modules to a controller system that is already controlling a process with, for example, 30 input/output modules. Therefore, users can use available installations for additional applications using machine learning analytics of high performance inputs. This limits deployment risks, additional cabling, installation costs, etc.

Continuing with reference to FIG. 1, in some embodiments, the output values may be transferred to the devices 135, 140, 145 via the input/output ports 115C, 120C, and 125C. In other embodiments, the AI accelerator processor 115A, 120A, and 125A may be used to derive one or more control instructions based on the output values; these output instructions can then be transferred to the devices 135, 140, 145 via the input/output ports 115C, 120C, and 125C. In one embodiment, each of the input/output ports 115C, 120C, and 125C comprise an input port for transferring the input data values to the respective technology module and an output port for transferring control instructions derived from the output data values to one of the devices 135, 140, and 145. The input and output ports can use the same networking protocol or different protocols. For example, in one embodiment, the input port corresponds to a USB connection between the device and the technology module, while the output port corresponds to an Ethernet connection between the device and the technology module.

This compression from high speed inputs enables the use of complex computation together with the relatively low speed backplane connectivity of a controller system. Advantages of this approach are that the high bandwidth data is not loading the resources of the controller system 100, tasks such as complex signal processing can be performed (e.g., object recognition and tracking based on camera feeds), results are available synchronously to the controller system 100 through its backplane bus 130 resource requirements like memory are limited to the shared memory of the backplane bus 130, and the technology modules 115, 120, 125 may be readily incorporated into existing controller systems thus allowing easy retrofit. As an alternative to the backplane bus 130, the technology modules 115, 120, 125 can be connected to any other type of controller system through a standard interface module that allows the exchange of data via PROFINET (e.g., PROFINET interface modules or PROFIBUS interface modules).

One advantage of the design shown in FIG. 1 is that different types of sensors can be connected and processed. That is, for current systems in the market (e.g., smart cameras, drones, digital companions, etc.) only a single modality or application is solved while for the proposed design any data producing system with USB, Ethernet or back plane connectivity can be used as inputs and applications can be customized. If a different modality (e.g., thermal vision) is preferable or a different camera vendor sells a camera that fulfills additional requirements such as the use in an explosion proof environment, it is generally not possible to use the limited offering of AI-enabled devices. By enabling plug and play connectivity through standard industrial interfaces, such as USB Vision and Ethernet Vision, the design shown in FIG. 1 is flexible and future proof for a customer. That is, if the original camera is no longer available or a better or cheaper model comes on the market, the user can just plug this in without necessarily requiring reprogramming of the system (the algorithms can be setup to automatically resize the input to the expected input format of the used neural network). Also, the approach allows the synchronous processing of mixed data (e.g., a camera input through USB), control parameter through the back plane and shared plant variables through Ethernet.

Figure 2:
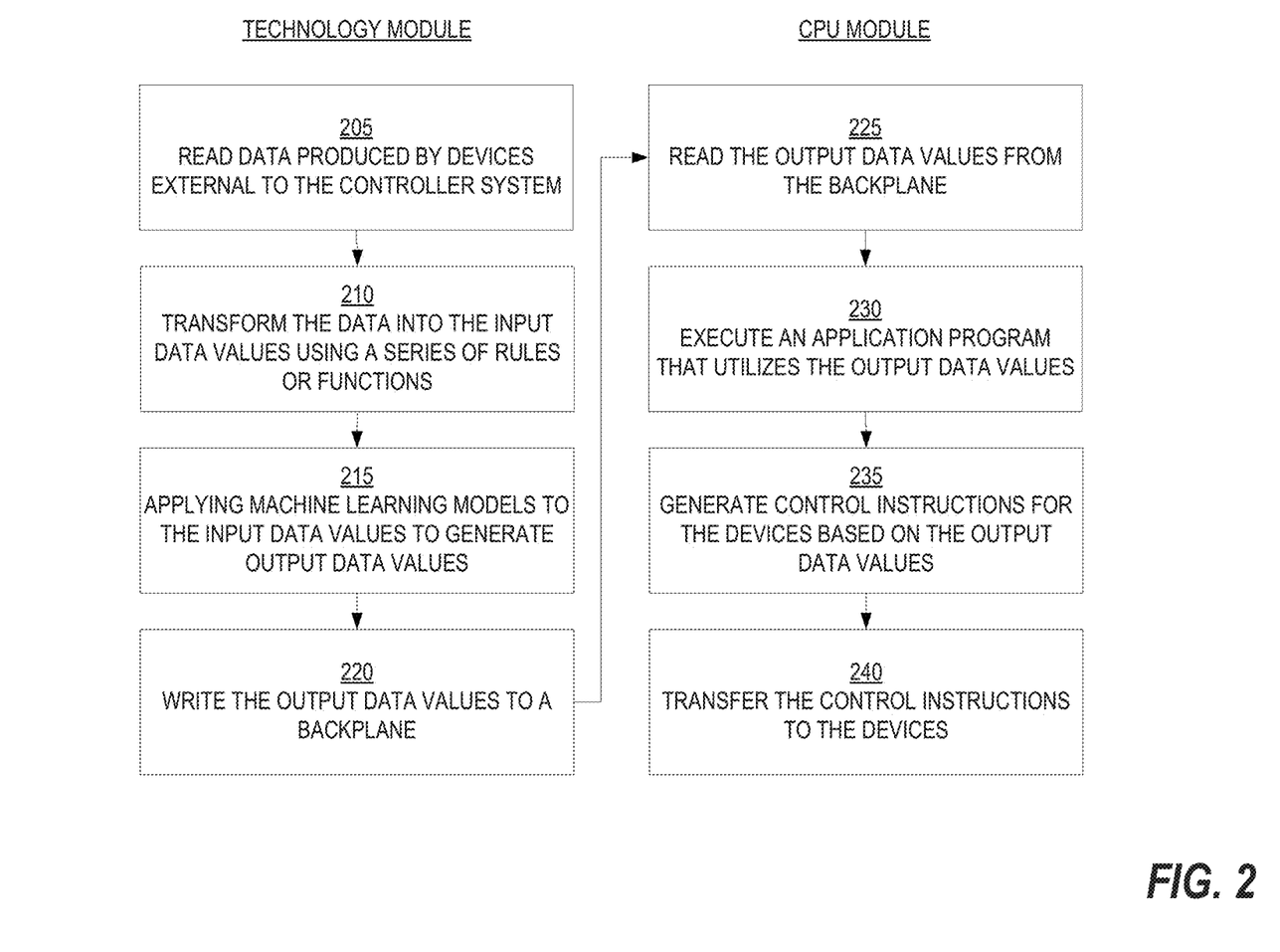
FIG. 2 shows a method for executing a machine learning model within a controller system comprising a CPU module and a technology module, according to some embodiments.

FIG. 2 shows a method for executing a machine learning model within a controller system comprising a CPU module and a technology module, according to some embodiments. Starting at steps 205-210, input data values for one or more machine learning models are generated based on data produced by devices external to the controller system. More specifically, a at step 205, technology module reads data produced by the devices, for example, using input/output ports included on each module (see FIG. 1). Then, at step 210, the technology module pre-processes the data to transform it into input data values for the machine learning models using a series of rules or functions.

Continuing with reference to FIG. 2, a step 215, an AI accelerator within the technology module applies the machine learning models to the input data values to generate one or more output data values. Next, at step 220, the technology module writes the output data values to a backplane connecting the CPU module and the technology module (see FIG. 1). The CPU module reads the output data values from the backplane at step 225. Next, at step 230, the CPU module executes an application program that utilizes the output data values. The application program may then use the output data values to control the devices. In the example of FIG. 2, at step 235, the CPU module generates one or more control instructions for the devices based on the output data values and at step 240 those control instructions are transferred to the devices.

In addition to enabling the real-time analysis of high throughput inputs for controller systems, in some embodiments, it is possible to use the technology module for high speed control. For example, the inputs can be provided through one input/output port of the technology module (e.g., a USB interface), and a control parameter or other output can be driven through another input/output port (e.g., the Ethernet interface). As the technology module does not require all outputs to flow through the controller system's backplane it is possible to react faster than the backplane cycle if high speed control applications are required. In this case, the control application would be fully contained within the technology module such that it provides control instructions directly to the devices. The technology module may then only exchange information with the other modules of the controller system at a lower frequency e.g., for exchange of metadata or status. One possible application could use the hardware accelerated stereo vision depth extraction of the Myriad X chip that analyzes 720p video at 180 Hz to notify about the exact location of a moving work piece.

Figure 3:
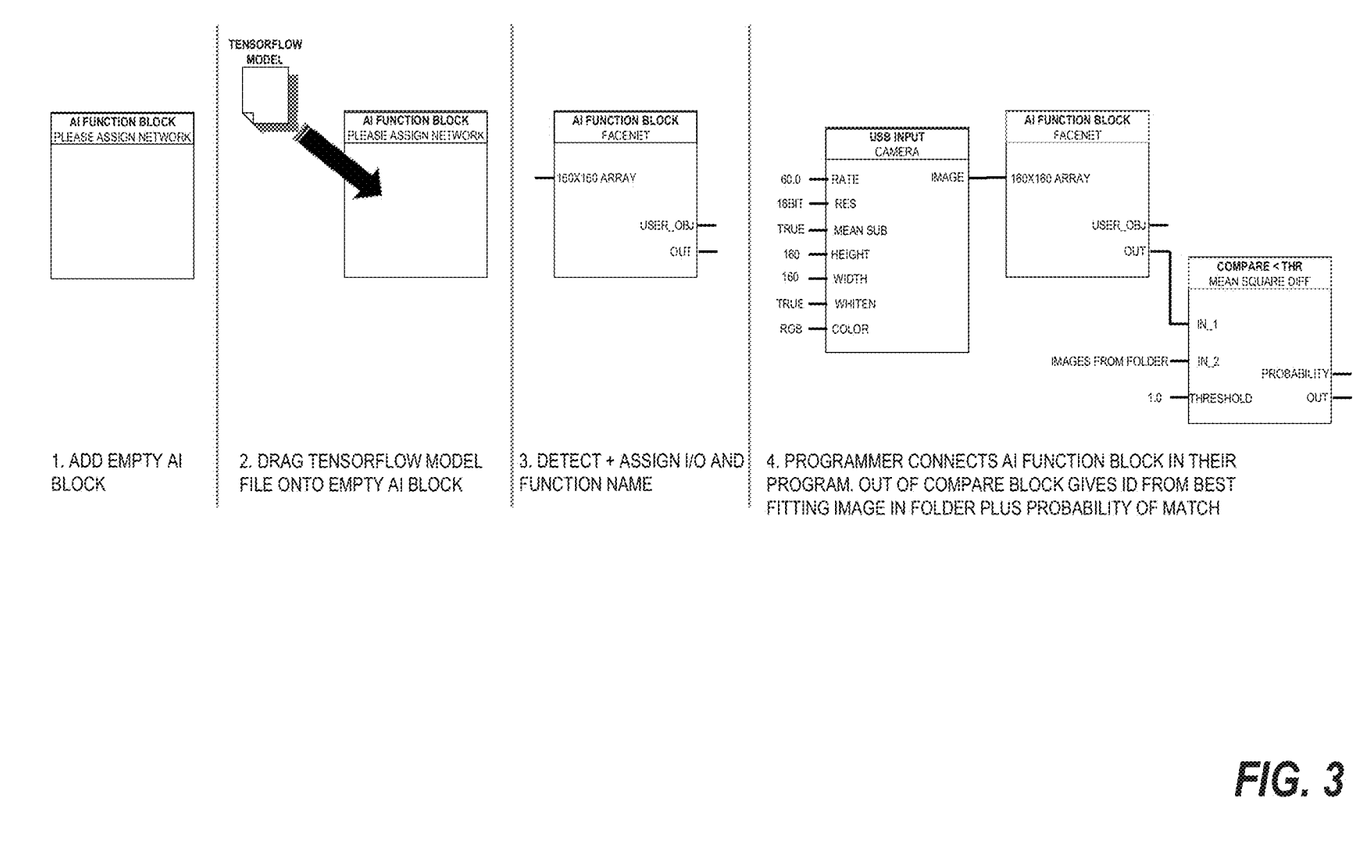
FIG. 3 illustrates a workflow for programming a control system, according to some embodiments.

FIG. 3 illustrates a workflow for programming a control system, according to some embodiments. This workflow utilizes a unified programming framework for PLC and AI applications using a GUI such as the Siemens Totally Integrated Automation (TIA) portal. State-of-the-art integration of AI and controller applications may either be implemented custom in the open controller or use external hardware (e.g., smart sensor inputs or GPU accelerated external machines). Therefore, different programming and integration frameworks are required leading to mostly custom setups. The complexity of the setup is significantly reduced by enabling deployment of AI and controller applications through a single programming framework. Also, performance can be improved when using a single programming framework rather than a combination of functions as the framework has unified control over the resources. For example, only one memory location has to be assigned for a variable that is used by aspects that would otherwise be processed in different tools. This limits unnecessary copying of data and memory allocations which saves processing time.

Continuing with reference to FIG. 3, a graphical user interface (GUI) is displayed on a host computer. This GUI includes a block-based editor for programming an automation program. In a first step, the programmer creates an empty AI function block in the GUI. The term "AI function block," as used herein refers to a function block that can support the inclusion of a reference to a machine learning model. Thus, if one or more standard function blocks can support such functionality they may be employed; otherwise, a custom AI function block may be used.

The programmer provides one or more commands that result in insertion of a visual representation of a machine learning model into the function block displayed in the GUI. For example in one embodiment, the programmer drags the visual representation into the function block. In the illustrated example, this is done in form of a Tensorflow model; however other model frameworks e.g., Caffe or Chainer could be used.

Next, a type signature of the machine learning model is determined. This type signature defines the inputs and outputs of the machine learning model. This may be performed, for example, by analyzing the code of the machine learning model itself, or using metadata associated with the machine learning model. Based on the inputs and outputs of the machine learning model, the inputs and outputs of the function block based on the inputs and outputs are defined. In the example of FIG. 3, it is assumed that the machine learning model contains information about the required inputs and outputs which is used to automatically parameterize the empty AI function block in resulting in a required image input of 160×160 pixel size and outputs such as a characteristic feature that is able to differentiate between people.

Next, the programmer needs to connect and parameterize an input source. For example, a USB camera driver needs to be selected and the recorded image needs to be preprocessed as expected by the used neural network. In this application the camera is set to record 60 frames per second, 16 bit resolution images, the mean value is subtracted from the image, the image is scaled to 160×160 points size, it is whitened and uses the RGB color scheme. The camera driver and all preprocessing are performed on the technology module as well as the execution of the machine learning model in the AI function block. The real-time updated image feature is then propagated over the backplane to the controller. In the controller system, this value is compared with a database of images as exemplified in the right most function block. The image in the database that has the closest score to the current image feature is the most likely detected candidate. However, the controller also provides a threshold that represents the maximum allowed difference between the features to accept the result as detection. Based on the score difference, the probability is computed that a particular user in the database is currently facing the camera. This probability and the ID of the user is output by the controller application and can be used in further parts of the control application executed by the controller system (e.g., to parameterize user interface settings). Once all the connections have been made, the function block may be compiled to generate code executable by the technology module. Then, the code can be deployed to a technology module (e.g., via the backplane bus or the input ports on the technology module).

In the paragraphs that follow, the various benefits of the technology module are described in more detail. First, the technology module described herein allows direct integration of advanced signal processing and analytics of high bandwidth inputs into standard controller systems. This significantly improves the reaction cycle time and therefore control performance. Also, no custom hardware is required from a second vendor thus simplifying the integration, setup and maintenance. Finally, new applications are enabled in a controller system using AI concepts.

The technology modules also provide AI acceleration performance without adding overhead on the controller by adding multiple modules. Conventional approaches would require inserting a PCIe card in an open controller. If more performance is needed a more performant PCIe card would be selected. Alternatively, an AI coprocessor would be included in a specific controller version. All data acquisition and preprocessing would need to be handled by the controller CPU thus potentially affecting its performance. Also, there are limited extension cards feasible in the supported power rating that the controller can supply over PCIe. High performance cards require active cooling which then affects the lifetime of the part and the environmental temperature rating. By plugging additional technology modules, the performance is extended together with the number of interfaces (e.g., USB and Ethernet). Also, all data acquisition and preprocessing is done on the modules thus minimally affecting performance at the controller. The consumed power is dissipated passively over a large area and if additional power supply is needed, it can be provided by separate power modules. This makes the technology module described herein much more flexible, efficient and scalable than state-of-the-art approaches. Also, it allows the use in rough industrial environments with vibrations and high environmental temperatures that would negatively affect bearings of fans and concentrated heat sources within the controller system.

The technology module described herein facilitates centralized device level analysis of multiple-source and multiple-modality data. PLCs and other controller systems are currently the backbone platform for plant data. Combining high speed inputs like camera or vibration streams with plant data is important or even required in many applications e.g., to take into account the operational state of a machine. Other applications require multiple modality inputs like a LIDAR for 3D distance information, a thermal camera for measuring the current surface temperature distribution and plant control variables to associate the current readings with the state of the process. This is naturally implemented in the technology module that shares plant parameters through the backplane bus and records the camera inputs through, for example, USB. This approach simplifies the setup at the customer site and therefore reduces costs, decreases the time to market of new applications and improves maintainability of the solution.

The plug and play aspect of the technology module described herein allows retrofit of AI features to controller systems currently in use. For example, technology module follows the standards of backplane connectivity used by most, if not all, controller systems. After uploading the program to the technology module, it operates without specialized driver requirements from the controller system. That is, the example ET200SP technology module could be attached to any ET200SP controller. Moreover, it could be connected to other controllers through PROFINET using a standard interface module. This feature reduces costs for customers that would like to add AI functionality as they do not require significant changes to their infrastructure. Also, solution providers can customize an AI application, deploy it on a technology module and sell the solution jointly with the hardware device rather than shipping installation software. Thus, the technology module could be configured for a clear, predefined task that doesn't require AI knowledge at the end customer side.

The technology module allows for the distributed, small size acceleration of AI features without requiring a dedicated controller. AI technology module can be paired and deployed with standard modules (e.g., PROFINET interface module). This combination is of small size and multiple systems can be distributed throughout the plant. For example, one of these combinations could be located at each robot in a facility to monitor the robot process visually while all robots are controlled through one controller that connects to all AI modules. This setup reduces the implementation and maintenance costs of the overall deployment The technology module facilitates the synchronous use of AI inputs with the control parameters. The use of a backplane-based technology module for AI acceleration naturally enables that the output of the technology module is shared in sync with the other inputs and outputs of the controller. This is important for reliably including the AI results in the control cycle of the control system. Alternative solutions that would for example use an external accelerator for vision based analytics of a process may for example buffer the results thus causing a misfit of the plant parameters and the vision analytics that could lead to faulty conclusions and control settings. Additional efforts would need to be taken to synchronize clocks or exchange additional timing signals between the systems. The aspect of synchronicity is important for reliable and repeatable performance.

The technology module being separate from the other modules of the system allows processing to be physically spread, and low power consumption enables passive cooling and application in hot environments. The use of an AI accelerator processor that implements main power consuming algorithms (e.g., neural network primitives) in hardware enables high performance at low power consumption~2 W. In turn, this enables deployment in a technology module with passive cooling. For higher performance, multiple technology modules can be combined. No active cooling is necessary when adding multiple accelerators as each of the modules has a defined physical footprint to dissipate heat. Also, as the head of multiple modules is physically distributed over a large area, there are no hotspots and the system can be used in a higher environmental temperature environment. This feature enables higher performance at a fixed environmental temperature in comparison to a common approach with a single, central higher performance chip within the controller chassis.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only.

Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

I claim:

1. A controller system comprising:
   a CPU module comprising a processor executing a control program;
   one or more technology modules, each technology module comprising an artificial intelligence (AI) accelerator processor and one or more machine learning models uploaded on to the technology module, wherein each technology module is configured to
      (a) receive input data values related to one or more machine learning models, and
      (b) apply the one or more machine learning models to the input data values to generate one or more output data values; and
   a backplane bus connecting the CPU module and the one or more technology modules,
   wherein the one or more technology modules transfer the output data values to the processor over the backplane bus and the processor uses output data values during execution of the control program.

2. The controller system of claim 1,
   wherein the output data values are transferred over the backplane bus synchronously with one or more additional inputs or outputs to the control program according to a scan cycle.

3. The controller system of claim 1,
   wherein the input data values are associated with one or more devices and each technology module includes one or more input/output ports facilitating a direct connection to the devices.

4. The controller system of claim 3,
   wherein each technology module further includes a preprocessing component configured to generate the input data values for the machine learning models based on data received from the devices.

5. The controller system of claim 4,
   wherein input/output ports dedicated to each device comprise an input port for transferring the input data values to the technology module and an output port for transferring control instructions derived from the output data values to the device.

6. The controller system of claim 5,
   wherein the input port corresponds to a USB connection between the device and the technology module.

7. The controller system of claim 5,
   wherein the output port corresponds to an Ethernet connection between the device and the technology module.

8. The controller system of claim 1, further comprising a chassis comprising a plurality of plugs for connecting the CPU module and the technology modules to the backplane bus.

9. The controller system of claim 1,
   wherein the CPU module and the technology modules each include interconnecting plugs that form the backplane bus.

10. A method for executing a machine learning model within a controller system comprising a CPU module and a technology module, the method comprising:

providing a technology module comprising an artificial intelligence (AI) accelerator processor and one or more machine learning models uploaded on to the technology module;

generating, by the technology module, one or more input data values based on data produced by devices external to the controller system;

applying, by an AI accelerator within the technology module, one or more machine learning models to the input data values to generate one or more output data values;

writing, by the technology module, the output data values to a backplane connecting the CPU module and the technology module; and reading, by the CPU module, the output data values from the backplane; and executing, by the CPU module, an application program that utilizes the output data values.

11. The method of claim 10,
wherein the application program uses the output data values to control the devices.

12. The method of claim 10,
wherein the input data values are generated by:
  reading, by the technology module, the data produced by the devices external to the controller system; and
  transforming, by the technology module, the data into the input data values using a series of rules or functions.

13. The method of claim 10, further comprising:
generating, by the technology module, one or more control instructions for the devices based on the output data values; and transferring, by the technology module, the control instructions to the devices.

14. The method of claim 10, further comprising:
generating, by the CPU module, one or more control instructions for the devices based on the output data values; and
transferring, by the CPU module, the control instructions to the devices.

15. A method for programming a control system, wherein the method comprising:
  displaying a graphical user interface (GUI), wherein the GUI includes a block-based editor for programming an automation program;
  inserting a visual representation of a machine learning model into a function block displayed in the GUI based on one or more user commands;
  identifying a type signature of the machine learning model defining inputs and outputs of the machine learning model;
  automatically defining one or more inputs and outputs of the function block based on the inputs and outputs of the machine learning model;
  connecting an input source to at least one of the inputs of the function block;
  connecting one or more outputs of the function block to an additional function block; and
  compiling the function block to generate code executable by the control system.

16. The method of claim 15,
wherein the function block is displayed in a first area of the GUI and the visual representation of the machine learning model is inserted into the function block by dragging the visual representation from a second area of the GUI onto the function block.

17. The method of claim 15,
wherein the machine learning model is a Tensorflow model.

18. The method of claim 15, further comprising:
deploying the code to a technology module within the control system.

19. A controller system comprising:
a CPU module comprising a processor executing a control program;
one or more technology modules, each technology module comprising an artificial intelligence (AI) accelerator processor and one or more machine learning models uploaded on to the technology module, wherein each technology module is configured to
  (a) receive input data values related to one or more devices, and
  (b) apply one or more machine learning models to the input data values to generate one or more output data values; and
an interface module exchanging data between the CPU module and the one or more technology modules;
wherein the one or more technology modules transfer the output data values to the processor via the interface modules and the processor uses output data values during execution of the control program.

20. A controller system comprising:
a CPU module comprising a processor executing a first control program;
one or more technology modules comprising an artificial intelligence (AI) accelerator processor configured to:
  receive input data values related to one or more devices,
  apply one or more machine learning models to the input data values to generate one or more output data values,
  execute a second control program to generate one or more control instructions for the devices based on the output data values,
  transmit the control instructions to the devices via one or more input/output ports of the technology module at a first data rate, and
  transmit status messages to the CPU module via a backplane bus or an interface module at a second data rate that is slower than the first data rate.

* * * * *